United States Patent Office 2,702,277
Patented Feb. 15, 1955

2,702,277

DETERGENT COMPOSITION

Paul W. Kinney, Phillipsburg, N. J., assignor to General Aniline & Film Corporation, New York, N. Y., a corporation of Delaware No Drawing. Application December 20, 1950,
Serial No. 201,875

17 Claims. (Cl. 252—89)

The present invention relates to detergent compositions, more particularly to liquid detergent compositions, and still more particularly to liquid hand cleaners of the polyalkylene glycol type.

It is well known that water-soluble non-ionic surface-active polyethylene glycol derivatives have excellent detergent properties, and increasing use has been made of these properties in detergent compositions. It is among the objects of this invention to provide an improved detergent composition of the aforementioned type. Other objects will appear hereinafter.

I have discovered that the addition of a water-soluble salt of an interpolymer of an alkyl vinyl ether with maleic anhydride to a water-soluble synthetic non-ionic surface-active polyethylene glycol derivative containing at least 4 ethenoxy groups makes possible the attainment of said objects. The resulting compositions are characterized by properties which are unexpected and highly advantageous. Thus it has been found that by such addition, smaller amounts of the polyethylene glycol derivative may be used with equal or improved detergent and foaming properties in the resulting compositions as compared with that of the said glycol derivative alone. It has further been found that such addition results in a composition having a higher viscosity and a soapy or slippery feel regarded as desirable in any detergent composition, particularly those of the liquid hand cleaner type. Without such addition, the said polyethylene glycol derivatives are characterized by a conspicuous lack of soapy hand, or feel. These mixtures may be made available in dried form as a powder, cake, or the like, in aqueous concentrate or in aqueous solution ready for use.

The interpolymers of vinyl alkyl ether with maleic anhydride broadly suitable for use in the present invention may be produced in a known manner, as for example, described in U. S. Patent 2,047,398. I prefer to employ the methyl vinyl ether-maleic anhydride interpolymer, although other alkyl vinyl ether-maleic anhydride interpolymers which are water-soluble at the desired pH range are operative, as for example, those derived from ethyl, propyl, isopropyl, butyl and isobutyl vinyl ethers and the like. The degree of polymerization and consequent molecular weight and specific viscosity have an effect upon the amount of interpolymer required. Thus, interpolymers of higher viscosity may be added to the detergent composition in lesser amounts than those of lower viscosity in order to obtain the desired properties. While a specific viscosity of about 4 is preferred, lower specific viscosities are effective especially if the concentration is raised, while specific viscosities higher than 4 permit the lowering of the amount used. In general, specific viscosities of from about 0.2 to about 6 or more may be used, these limitations being only determined by what is available for use at present.

The preferred water-soluble salts of these interpolymers are those of sodium and potassium since by their use a composition having the desired properties with a pH of around 6 to 7, considered to be dermatologically the least active, is attained. However, other salts, such as those with ammonium hydroxide and the like may be employed. Potassium hydroxide is particularly preferred because it has been found to give the solution a higher viscosity than either sodium hydroxide or ammonium hydroxide.

The water-soluble synthetic non-ionic surface-active polyethylene glycol derivatives included in the scope of the present invention are, as a class, well known in the art and may in general be prepared by reaction of an appropriate compound with the required amount of ethylene oxide or its equivalent. Thus, polyethylene glycol derivatives operative in the present invention, and their methods of production, are adequately set forth in U. S. Patents Nos. 1,970,578, directed to derivatives of carboxylic acids, alcohols and amines; 2,085,706, directed to derivatives of amides; 2,205,971, directed to derivatives of mercaptans; and 2,213,477, directed to derivatives of ring-substituted, isocyclic hydroxyl compounds. To impart water-solubility, the polyethylene glycol radical should contain at least 4 ethenoxy groups; in general, from about 7 to 32 or more should be present for best results.

In general, only minor proportions, preferably from about 5 to about 40% of the interpolymer, in the viscosity range presently available, based on the weight of the polyethylene glycol derivative will produce the desired results. About 8% is the preferred amount, primarily for economic reasons, being about the minimum amount required to give an appreciable effect using an interpolymer with a specific viscosity of about 4. As employed herein, the term "specific viscosity" means the specific viscosity of 1 g. of the interpolymer per 100 ml. of methyl ethyl ketone.

The invention is further illustrated by the following examples, although it is to be understood that they are illustrative and not limitative, parts being by weight.

Example 1

A

| | Parts |
|---|---|
| Water | 75. |
| Vinyl methyl ether-maleic anhydride interpolymer (specific viscosity=4) | 0.4 |

B

| | |
|---|---|
| Polyethylene glycol ether of diamyl phenol (containing about 8 to 10 ethyleneoxy groups) | 5 |
| Carbowax 1500, melted (polyethylene glycol) | 5 |

Mix A and B, perfume to suit, and add enough water to give 100 parts. The perfumes used were synthetic oil of lemon grass and oil of ylang-ylang.

Example 2

| | Parts |
|---|---|
| Water | 94.6 |
| Vinyl methyl ether-maleic anhydride interpolymer (specific viscosity=4) | 0.4 |
| KOH—enough to give a pH of 7 | |
| Polyethylene glycol ether of isooctyl phenol (containing about 8 to 10 ethyleneoxy groups) | 5.0 |

Example 3

| | Parts |
|---|---|
| Water | 90 |
| Vinyl methyl ether-maleic anhydride interpolymer (specific viscosity=4) | 0.4 |
| KOH—enough to give a pH of 7 | |
| Carbowax 1500 (polyethylene glycol) | 5.0 |
| Polyethylene glycol ether of isooctyl phenol (containing about 8 to 10 ethyleneoxy groups) | 5.0 |
| 8-hydroxyquinoline | 0.01 |

The following polyethylene glycol derivatives substituted for the isooctyl phenol derivative in Example 2, produce compositions of similarly improved detergency, feel, foaming properties and the like:

| Example | Polyethylene glycol derivative |
|---|---|
| 4 | 1 mol nonyl phenol plus 9 mols ethylene oxide. |
| 5 | 1 mol castor oil plus 20 mols ethylene oxide. |
| 6 | 1 mol tall oil plus 18 mols ethylene oxide. |
| 7 | 1 mol oleyl alcohol plus 20 mols ethylene oxide. |
| 8 | 1 mol dodecyl mercaptan plus 9 mols ethylene oxide. |
| 9 | 1 mol soybean oil amine plus 10 mols ethylene oxide. |
| 10 | 1 mol rosin amine plus 32 mols ethylene oxide. |
| 11 | 1 mol coconut fatty acid amide plus 7 mols ethylene oxide. |

Potassium hydroxide—enough to adjust pH to 6.8.
The 8-hydroxyquinoline of Example 3 prevents mold growth which would effect the compositions of Examples 1, 2 and 4–11. Of course, any other disinfectant, pesticide and/or fungicide or the like may be added for its own particular function. Carbowax 1500 though not effecting the hand or feel of the compositions, leaves the hands with a slightly softer feel after drying.

My invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

I claim:

1. A detergent composition comprising a water soluble synthetic non-ionic surface active agent derived from a compound containing at least six carbon atoms and a reactive hydrogen atom, said agent further containing a polyoxyethylene chain of at least four ethenoxy groups, and from about 5 to about 40 per cent by weight thereof of a water soluble salt of an interpolymer of a lower alkyl vinyl ether with maleic anhydride.

2. A detergent composition as defined in claim 1 wherein the weight of said salt is about 8 per cent of the weight of said surface active agent.

3. A detergent composition as defined in claim 1 wherein said lower alkyl vinyl ether is methyl vinyl ether.

4. The composition of claim 1 in which said non-ionic surface active agent is the polyethylene glycol ester of castor oil.

5. The composition of claim 1 in which said non-ionic surface active agent is the polyethylene glycol ether of oleyl alcohol.

6. The composition of claim 1 in which said non-ionic surface active agent is the polyethylene glycol thioether of dodecyl mercaptan.

7. A composition as defined in claim 1 wherein said compound is diamyl phenol.

8. A composition as defined in claim 1 wherein said compound is isooctyl phenol.

9. A composition as defined in claim 2 wherein said compound is castor oil.

10. A composition as defined in claim 2 wherein said compound is oleyl alcohol.

11. A composition as defined in claim 2 wherein said compound is dodecyl mercaptan.

12. A detergent composition comprising a water-soluble polyethylene glycol ether of an alkyl phenol and from about 5 to about 40% by weight thereof of a water-soluble salt of an interpolymer of a lower alkyl vinyl ether with maleic anhydride.

13. A detergent composition comprising a water-soluble polyethylene glycol ether of an alkyl phenol and about 8% by weight thereof of a water-soluble salt of an interpolymer of a lower alkyl vinyl ether with maleic anhydride.

14. A detergent composition comprising a water-soluble polyethylene glycol ether of an alkyl phenol and from about 5 to about 40 per cent by weight thereof of a water-soluble salt of an interpolymer of a methyl vinyl ether with maleic anhydride.

15. A detergent composition comprising a water-soluble polyethylene glycol ether of an alkyl phenol and about 8% by weight thereof of a water-soluble salt of an interpolymer of a methyl vinyl ether with maleic anhydride.

16. A detergent composition comprising a water-soluble polyethylene glycol ether of diamyl phenol and about 8% by weight thereof of a water-soluble salt of an interpolymer of methyl vinyl ether with maleic anhydride.

17. A detergent composition comprising a water-soluble polyethylene glycol ether of isooctyl phenol and about 8% by weight thereof of a water-soluble salt of an interpolymer of methyl vinyl ether with maleic anhydride.

References Cited in the file of this patent

UNITED STATES PATENTS

| | | |
|---|---|---|
| 1,970,578 | Scheoller et al. | Aug. 21, 1934 |
| 2,047,398 | Voss et al. | July 14, 1936 |
| 2,543,744 | Fox et al. | Mar. 6, 1951 |

FOREIGN PATENTS

| | | |
|---|---|---|
| 488,686 | Great Britain | July 12, 1938 |

UNITED STATES PATENT OFFICE

CERTIFICATE OF CORRECTION

Patent No. 2,702,277 February 15, 1955

Paul W. Kinney

It is hereby certified that error appears in the printed specification of the above numbered patent requiring correction and that the said Letters Patent should read as corrected below.

Column 2, line 79, strike out "Potassium hydroxide—enough to adjust pH to 6.8.", and insert the same following line 34, same column.

Signed and sealed this 29th day of March, 1955.

(SEAL)

Attest:

E. J. MURRY
Attesting Officer

ROBERT C. WATSON
Commissioner of Patents